(12) United States Patent
Smith et al.

(10) Patent No.: US 7,837,582 B2
(45) Date of Patent: Nov. 23, 2010

(54) BI-DIRECTIONAL BELT TENSIONER

(75) Inventors: Gary Smith, Wilmington, NC (US);
William McCotter, Wilmington, NC (US); Thomas Hughes, Wilmington, NC (US); Carl Cura, Wilmington, NC (US)

(73) Assignee: Fenner, Inc., Manheim, PA (US)

( * ) Notice: Subject to any disclaimer, the term of this patent is extended or adjusted under 35 U.S.C. 154(b) by 0 days.

(21) Appl. No.: 10/632,703

(22) Filed: Aug. 1, 2003

(65) Prior Publication Data
US 2004/0097311 A1 May 20, 2004

Related U.S. Application Data

(63) Continuation-in-part of application No. 10/354,397, filed on Jan. 30, 2003, now Pat. No. 6,855,079.

(60) Provisional application No. 60/414,861, filed on Sep. 30, 2002.

(51) Int. Cl.
*F16H 7/12* (2006.01)
(52) U.S. Cl. .................. 474/135; 474/117; 474/138
(58) Field of Classification Search ......... 474/132–235, 474/109, 112, 101, 117
See application file for complete search history.

(56) References Cited

U.S. PATENT DOCUMENTS

| | | | |
|---|---|---|---|
| 2,558,311 A | 6/1951 | Morrow | |
| 3,091,947 A | 6/1963 | Thomsen | |
| 4,253,343 A | 3/1981 | Black et al. | |
| 4,285,676 A | 8/1981 | Kraft | |
| 4,309,174 A | 1/1982 | Sproul | |
| 4,458,403 A | 7/1984 | Foster | |
| 4,464,147 A | 8/1984 | Foster | |
| 4,466,803 A | 8/1984 | Wilson | |
| 4,472,162 A | 9/1984 | Hitchcock | |
| 4,473,362 A | 9/1984 | Thomey et al. | |
| 4,504,254 A | 3/1985 | Foster | |
| 4,525,152 A | 6/1985 | Speer et al. | |
| 4,536,172 A | 8/1985 | Burris et al. | |
| 4,557,709 A | 12/1985 | St. John | |
| 4,661,087 A | 4/1987 | Henderson | |
| 4,689,037 A | 8/1987 | Bytzek | |

(Continued)

FOREIGN PATENT DOCUMENTS

DE 4300178 4/1994

(Continued)

*Primary Examiner*—Marcus Charles
(74) *Attorney, Agent, or Firm*—Stephen H. Eland; Dann, Dorfman, Herrell & Skillman

(57) ABSTRACT

An assembly for maintaining tension in a drive belt features a housing mounted on a base. The housing contains a biasing element that exerts torque on the housing to bias the housing in a radial direction. A lever arm is connected to the housing and rotates with the housing in response to the bias of the biasing element. A pulley is connected to the lever arm and engages a drive belt in response to the bias force of the biasing element on the lever arm. The pulley deflects the shape of the belt to provide tension in the belt. In one embodiment, the apparatus allows the user to switch the position of the biasing element and alter the direction of torque on the lever arm. In another embodiment, the lever arm and pulley are removable from the housing and replaceable with other arms and pulleys having different configurations.

14 Claims, 19 Drawing Sheets

U.S. PATENT DOCUMENTS

| | | | |
|---|---|---|---|
| 4,822,322 A | 4/1989 | Martin | |
| 4,826,471 A | 5/1989 | Ushio | |
| 4,886,483 A | 12/1989 | Henderson | |
| 4,906,222 A | 3/1990 | Henderson | |
| 4,934,987 A | 6/1990 | Kadota et al. | |
| 4,952,197 A | 8/1990 | Henderson | |
| 4,957,471 A | 9/1990 | St. John | |
| 4,971,589 A | 11/1990 | Sidwell et al. | |
| 4,983,145 A | 1/1991 | Hirai et al. | |
| 4,985,010 A | 1/1991 | Henderson | |
| 5,015,217 A | 5/1991 | Henderson | |
| 5,030,172 A | 7/1991 | Green et al. | |
| 5,131,889 A | 7/1992 | Meckstroth et al. | |
| 5,370,586 A | 12/1994 | Thomsen et al. | |
| 5,470,279 A * | 11/1995 | Brandenstein et al. | 474/135 |
| 5,496,221 A | 3/1996 | Gardner et al. | |
| 5,575,726 A | 11/1996 | Gardner et al. | |
| 5,718,649 A | 2/1998 | Hong et al. | |
| 5,795,257 A | 8/1998 | Giese et al. | |
| 5,803,849 A | 9/1998 | Ayukawa | |
| 5,918,717 A | 7/1999 | Fohl | |
| 5,919,107 A * | 7/1999 | Stepniak | 474/133 |
| 5,964,674 A | 10/1999 | Serkh et al. | |
| 6,217,471 B1 | 4/2001 | Brandsma et al. | |
| 6,231,465 B1 | 5/2001 | Quintus | |
| 6,565,468 B2 | 5/2003 | Serkh | |
| 6,575,860 B2 | 6/2003 | Dutil | |
| 6,582,332 B2 | 6/2003 | Serkh | |

FOREIGN PATENT DOCUMENTS

| | | |
|---|---|---|
| EP | 482382 | 4/1992 |
| EP | 0709595 | 5/1996 |
| JP | 63-308259 | 12/1988 |
| JP | 03-163245 | 7/1991 |
| JP | 04-347043 | 12/1992 |
| JP | 06-280950 | 10/1994 |
| JP | 07-103296 | 4/1995 |
| WO | 97/07584 | 2/1997 |

* cited by examiner

BI-DIRECTIONAL BELT TENSIONER

RELATED APPLICATIONS

This application is a continuation-in-part of U.S. patent application Ser. No. 10/354,397, filed Jan. 30, 2003 now U.S. Pat. No. 6,855,079. This application also claims priority under 35 U.S.C. §119 to U.S. Provisional Application No. 60/414,861, filed Sep. 30, 2002.

FIELD OF THE INVENTION

The present invention relates generally to belt tensioners, and more specifically to mechanical spring-actuated or biased belt tensioners for use in continuously maintaining tension in endless drive belts in power transmission drive systems.

BACKGROUND OF THE INVENTION

The known belt tensioners are mostly related to designs that are used in maintaining belt tension in serpentine belt drives for automotive applications. While the majority of the known tensioners pertain to automotive application tensioners, there are other industrial applications where machines have drive systems that have motors driving pulleys with endless belts that need to be tensioned. One example of the prior art is shown in U.S. Pat. No. 4,557,709.

SUMMARY OF THE INVENTION

The present invention is an assembly for maintaining tension in a drive belt. The assembly features a housing mounted on a fixed base. The housing contains a biasing element having a first end that engages the housing and a second end that engages the base. The biasing element exerts a torque on the housing to bias the housing in a first rotational direction relative to the base. A lever arm is connected to the housing and rotates with the housing in response to the bias of the biasing element. A pulley is connected to the lever arm and is pressed into engagement with the drive belt in response to the bias on the lever arm. The pulley deflects the shape of the belt to provide tension in the belt.

In one embodiment, the apparatus has a modular construction that provides the user with flexibility to assemble the apparatus in a manner that applies torque in either a clockwise or counterclockwise direction. In another embodiment, the device has a multi-part modular construction that allows lever arms and pulleys having different sizes and shapes to be used with the same housing and base. The lever arm, pulley, or both may be removed from the apparatus and replaced with a different sized lever arm and/or pulley to accommodate a different belt drive system or a different tensioning arrangement. Lever arms and pulleys having very simple configurations may be used with the housing and base. As such, the manufacturing costs for the lever arms and pulleys are reduced in comparison to prior art tensioning apparatuses. The housing portion of the modular arm may be constructed with a pivot feature that incorporates ball bearings. The ball bearings reduce the effects of frictional resistance generated when torque is provided in the tensioning apparatus.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE PREFERRED EMBODIMENTS

Figure 1:
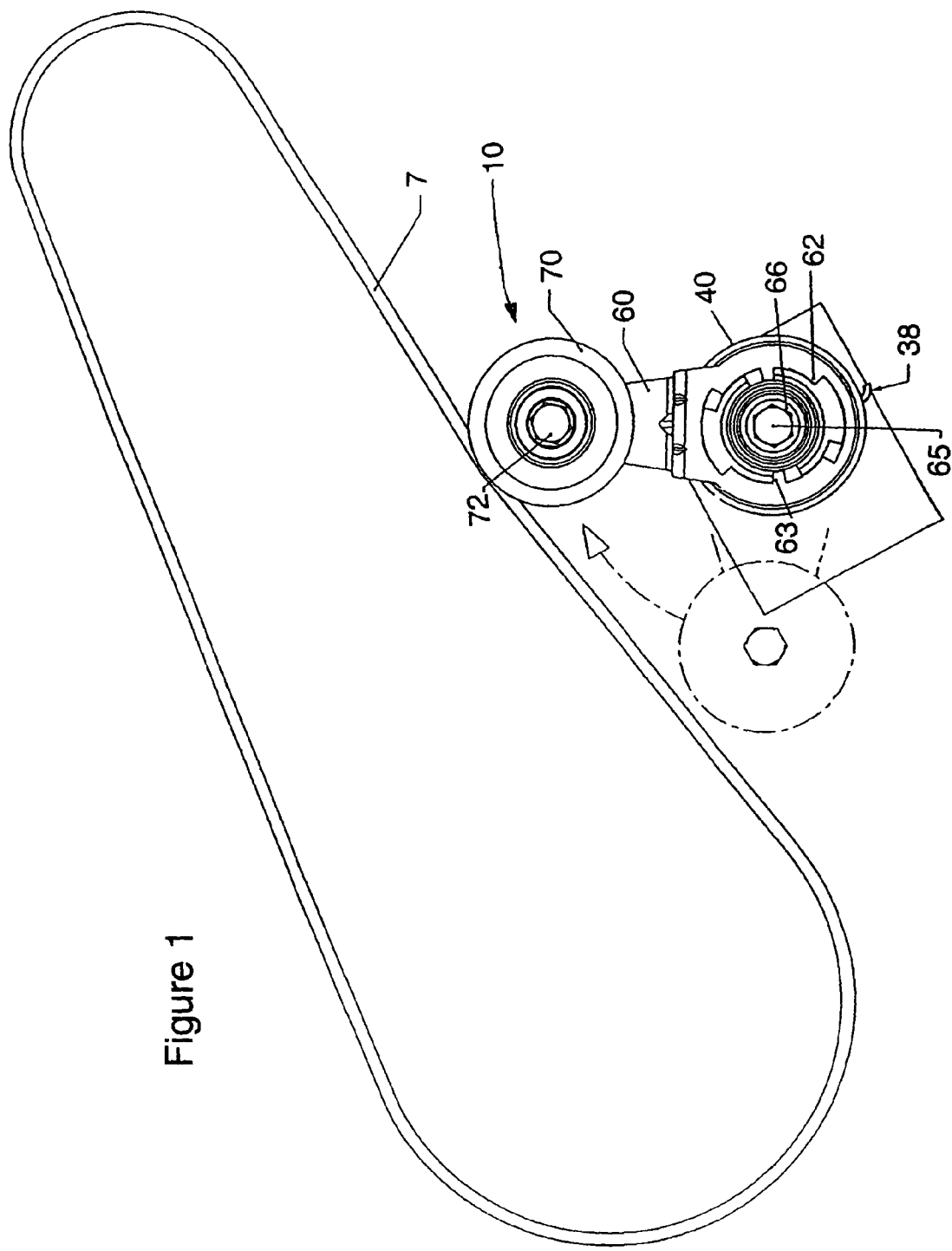
FIG. 1 is a diagram of a typical application, including a belt, tensioner assembly and idler pulley.
Figure 2:
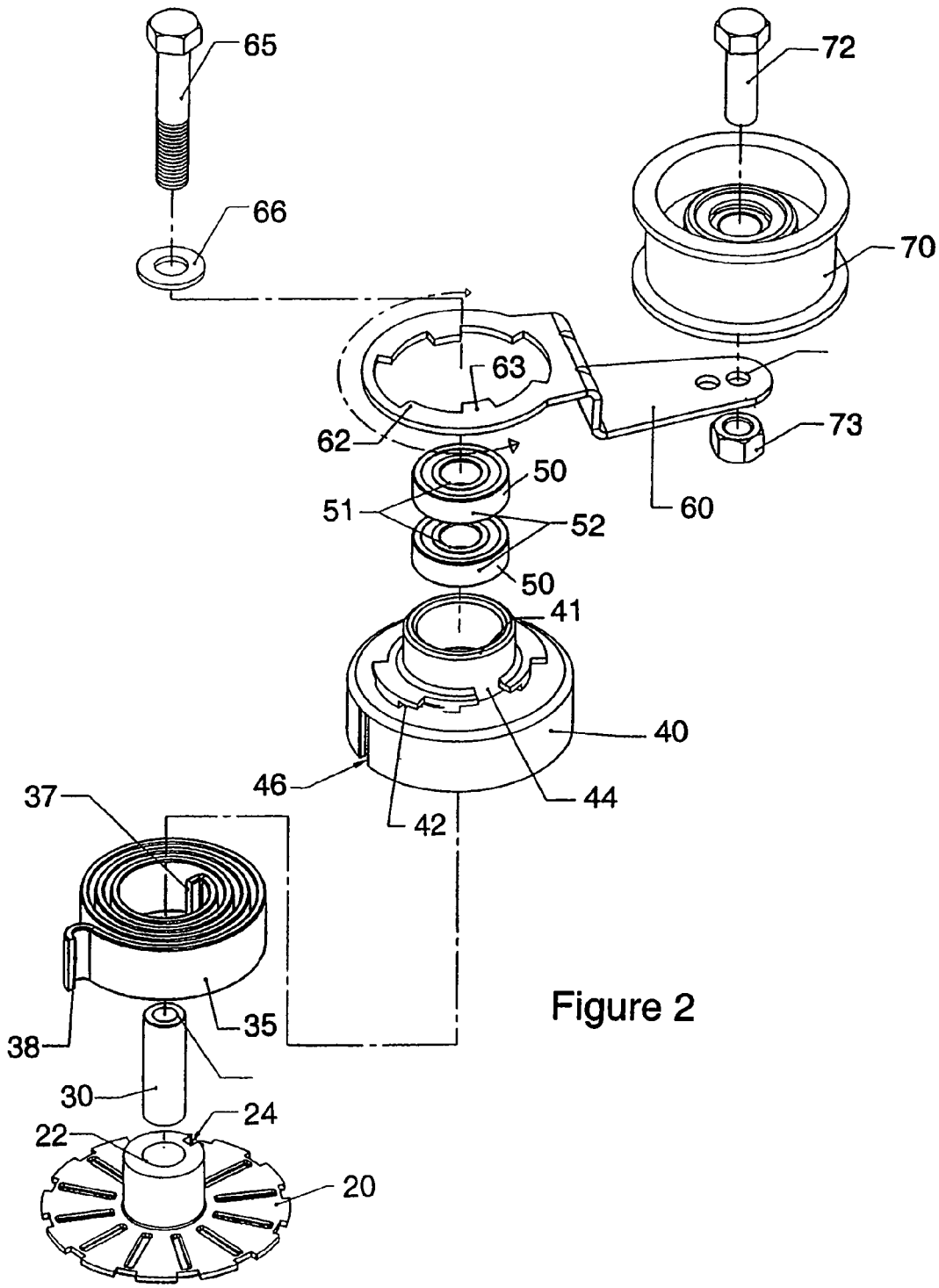
FIG. 2 is an exploded perspective view of the present configuration of the belt tensioner assembly shown with a flat belt idler pulley and mounting hardware.
Figure 3:
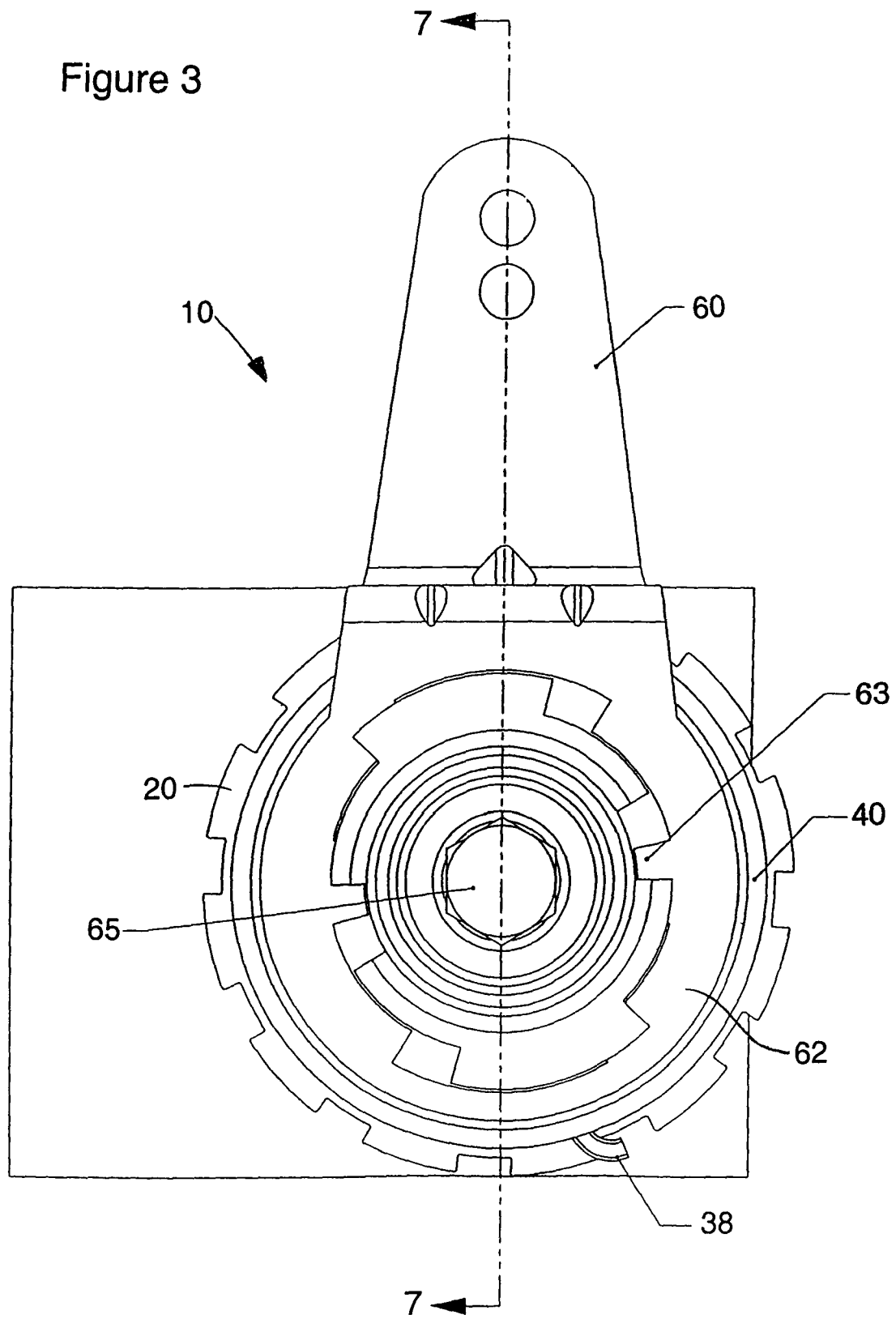
FIG. 3 is a front elevation view of the tensioner without the idler pulley.

Referring now to the drawings in general, and to FIGS. 1 and 2 specifically, a tensioner apparatus is generally designated 10. The tensioner 10 biases an idler pulley 70 into engagement with a belt 7. The tensioner 10 includes a pivotable arm 60 removably attached to a housing 40. The arm 60 is under bias from a biasing element 35 in the housing 40. The pulley 70 is connected to the end of the arm 60 and engages the belt 7 to apply tension to the belt under the bias from the biasing element 35.

The tensioner 10 has a modular construction that allows the housing 40 to be readily assembled with arms 60 and pulleys 70 having a variety of sizes. As such, the tensioner 10 may be provided as an assembly or kit which comprises a biasing element 35, a housing 40, and a variety of lever arms 60 and pulleys 70 having different sizes. Depending on the application, a lever arm 60 and pulley 70 having appropriate dimensions may be selected and connected to the housing 40.

The modular construction of the tensioner 10 permits easy disassembly and access to the biasing element 35. Referring to FIG. 2, the tensioner 10 comprises a torsion spring 35. The spring 35 is readily removable from the housing 40 and can be reinserted in an opposite or reverse configuration to change the direction of the bias exerted on the lever arm 60.

Referring now to FIG. 2, the details of the tensioner will be described in greater detail. The housing 40 is mounted over a base 20. The base includes a central boss or hub 22 projecting upwardly. The hub 22 is generally cylindrical having a central bore and a vertical slot 24 extending along the height of the hub. The central bore of the base 20 is sized to receive a cylindrical shaft 30. The base 20 is preferably injection molded in a fiber reinforced nylon material. Alternatively, the base could be made using other mold types or manufacturing processes.

The shaft 30 is cylindrical, having a central bore that extends through the shaft. The shaft may be made from a steel tubing, or from a machined from a solid piece of metal, such as steel alloy. The bore through the shaft 30 aligns with the bore in the hub 22 to allow the insertion of a mounting bolt 65.

Figure 6:
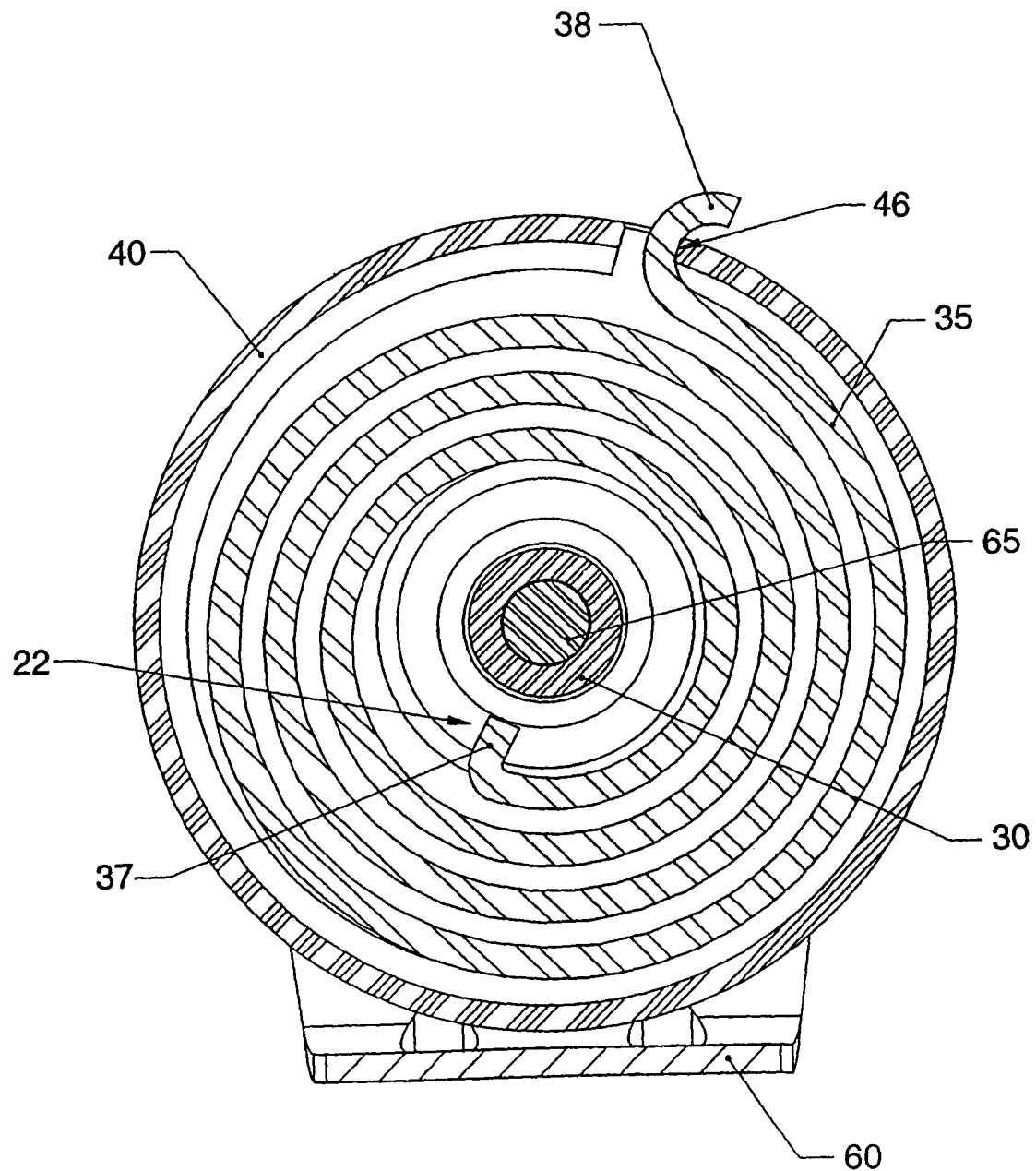
FIG. 6 is a sectional view of the device in FIG. 5 taken along the line 6-6.
Figure 7:
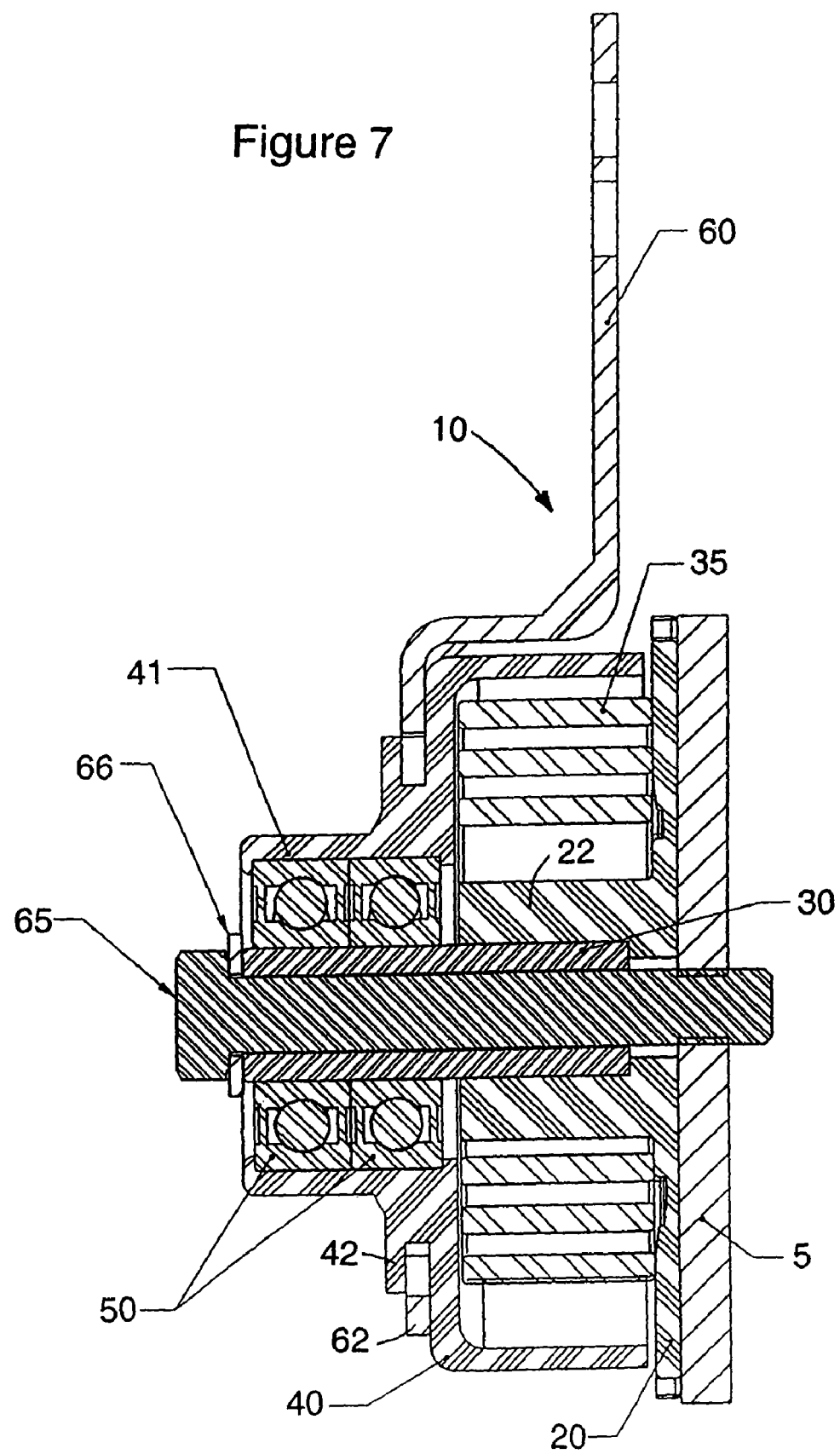
FIG. 7 is a sectional view of the device in FIG. 3 taken along the line 7-7.
Figure 8:
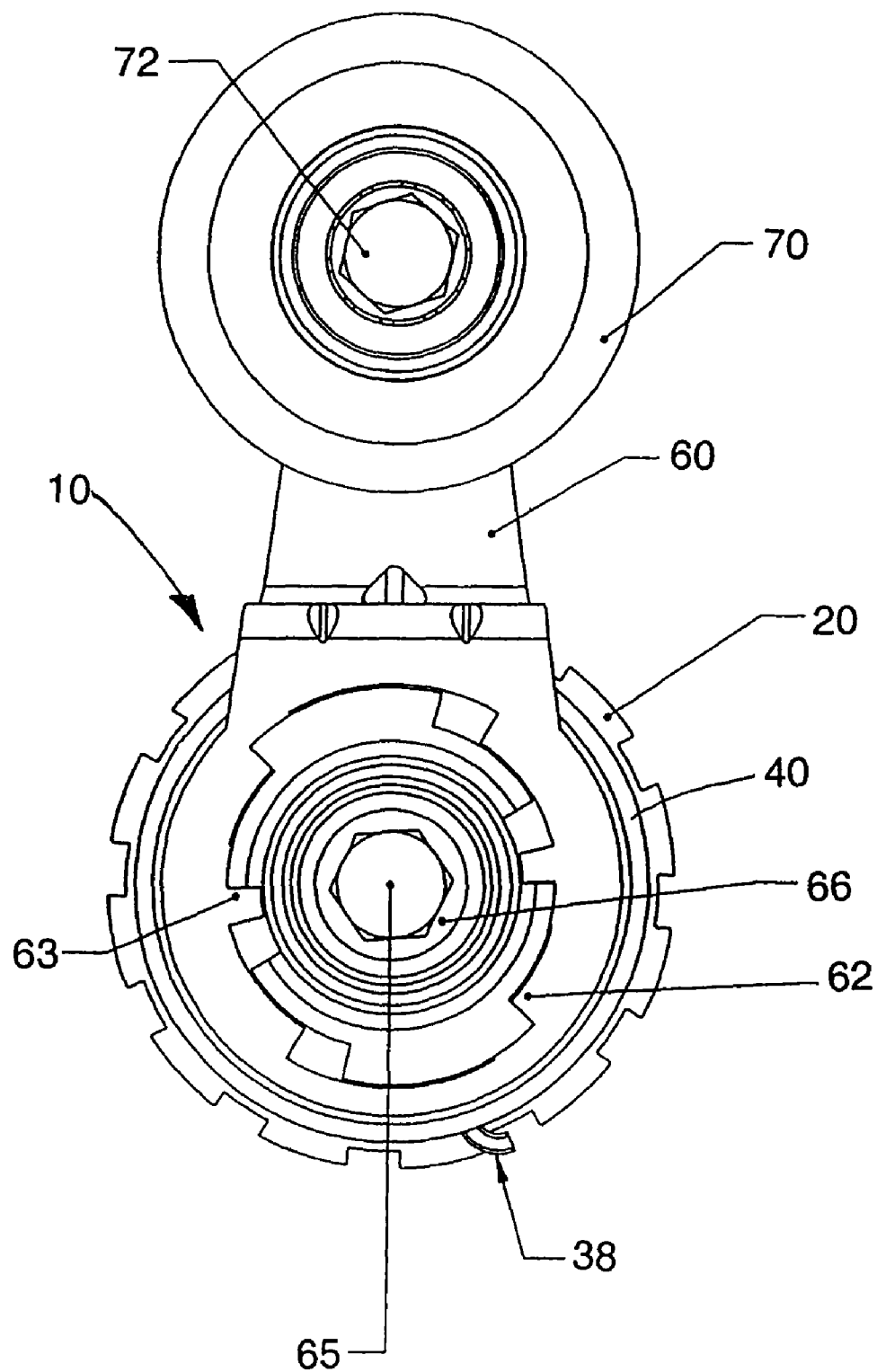
FIG. 8 is a front view of the belt tensioner assembly illustrated in FIG. 2.
Figure 9:
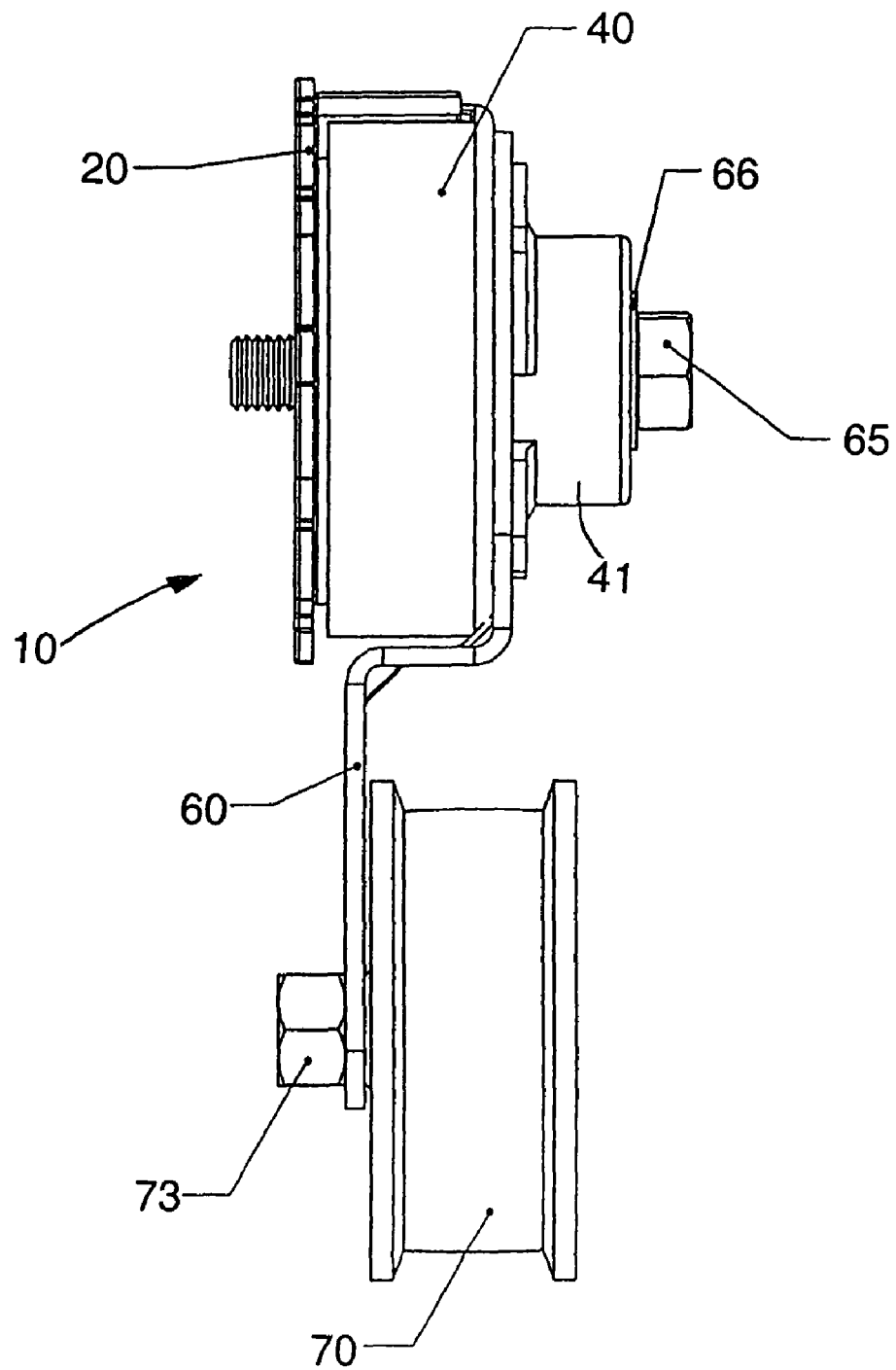
FIG. 9 is a side elevational view of the tensioner assembly shown in FIG. 8.
Figure 10:
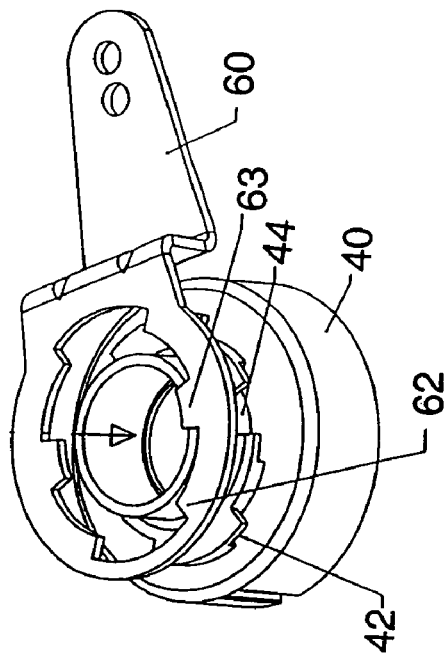
FIG. 10 is a detail showing the housing portion of the design along with the arm. It is the first in a sequence of FIGURES showing the "Bayonet" type of method that connects the arm to the housing. This particular detail shows the arm and the housing in an exploded view, with the tab sections on the arm aligned with the notch sections on the housing. The arrow shows that once the tabs are aligned with the slots, the arm can then be moved down, flush with the housing.
Figure 11:
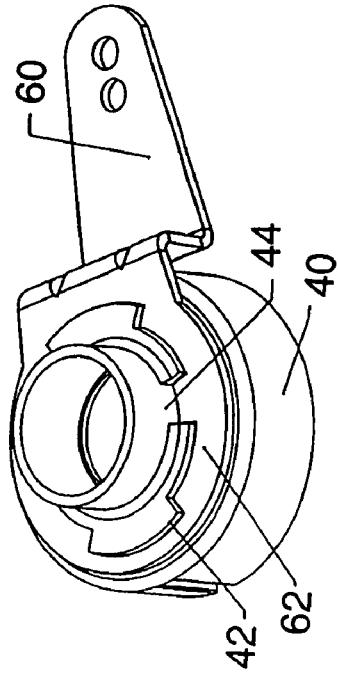
FIG. 11 is the next in the arm/housing assembly sequence, showing the arm with the tabs aligned with the slots in the housing, and with the bottom surface of the arm in contact with the top surface of the housing.
Figure 12:
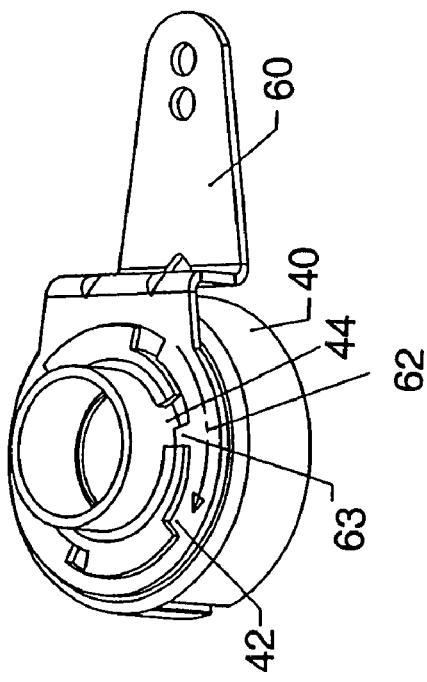
FIG. 12 is the last in the sequence of the arm/housing assembly sequence, showing the arm rotated in a clockwise direction relative to the housing, and the tabs on the arm engaged into the slots in the housing. This sequence can also be achieved in a counter clockwise manner, since the features are mirrored on both sides of the parts.

The spring 35 is a spiral spring formed from a long piece of rectangular steel that is formed in a spiral fashion to create a plurality of overlapping convolutions. The inner end 37 of the spring 35 forms a tongue that is inserted into the slot 24 in the hub 22 of the base 20. The outer end 38 of the spring 35 also forms a tongue, which engages the housing 40 as described further below. The inner convolutions of the spring 35 have a diameter that is larger than the outer diameter of the hub 22 so that the spring is disposed around the hub 22, as shown in FIG. 6.

The housing 40 is also preferably injection molded in a fiber reinforced nylon material, however the base could also be made using other manufacturing processes. The housing 40 is generally cylindrical, preferably having a height that is less than its diameter. A vertical opening or slot 46 is formed in the side of the housing 40 and is configured to receive the outer end 38 of the spring 35. The top of the housing 40 includes a locking flange 42 and a gap 44 configured to cooperate with the arm 60 to releasably attach the arm to the housing, as discussed further below.

The housing 40 includes a central hub 41 having an opening in which one or more bearing assemblies 50 are disposed. The bearings 50 are radial ball bearings that can either be pressed into the central bore of the housing to form an interference fit or alternatively can be insert molded into the central bore during the molded process. Although the device is shown in with ball bearings, other types of bearing elements can be used. For instance, a plain bearing, bushing or liner without ball bearings can be used. Accordingly, the term bearings is intended to refer both to bearing elements that have ball bearings, and bearing elements that do not include ball bearings.

The outer race 52 of each bearing is fixed to the central bore of the housing 40. The shaft 30 extends through the bearings 50 so that the inner race 51 of each bearing engages the outer surface of the shaft 30. In this way, the bearings allow the housing 40 to rotate relative to the shaft 30, so that the shaft 30 forms a rotational axis around which the housing rotates.

Figure 4:
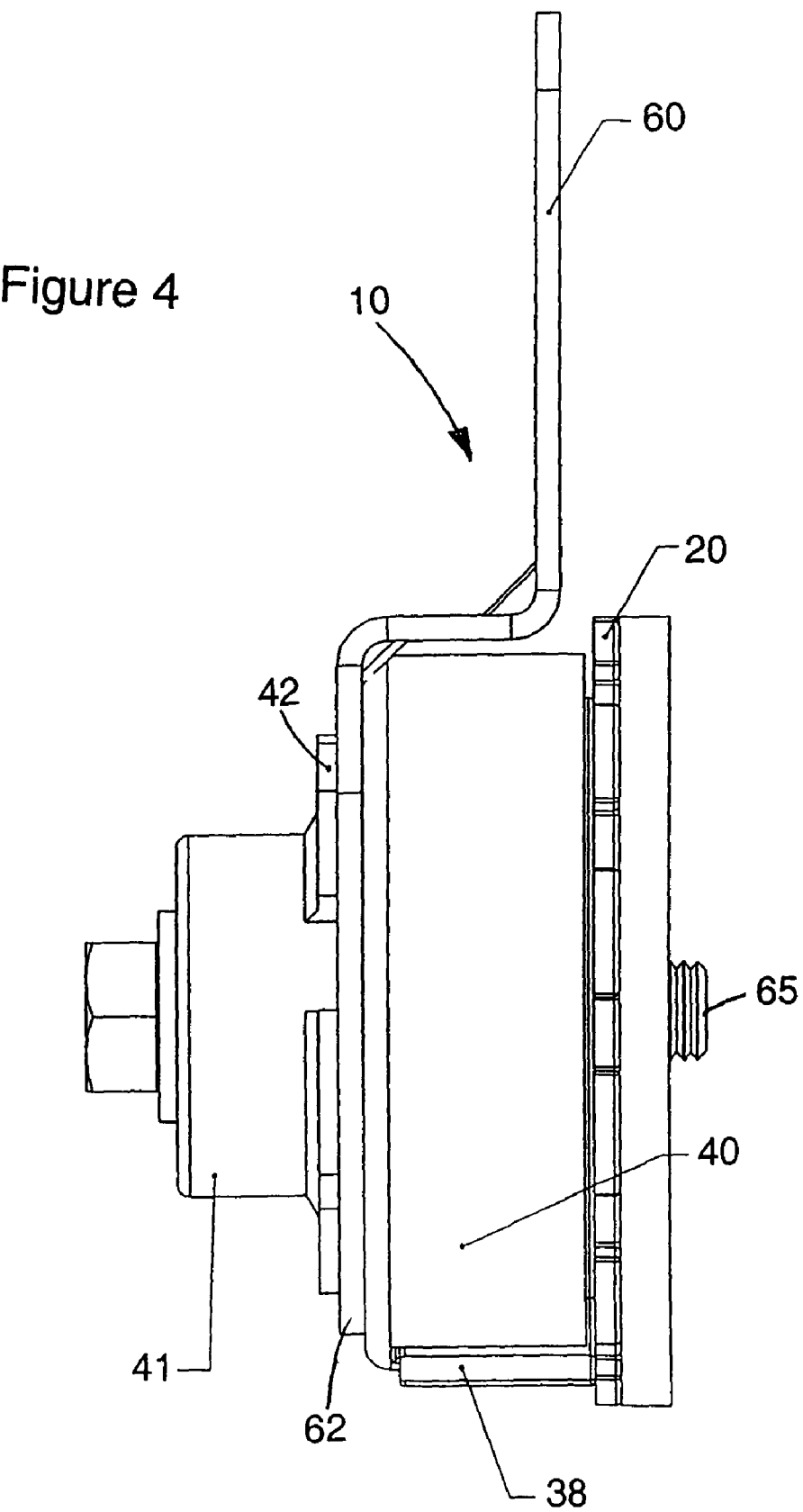
FIG. 4 is a side elevational view of the tensioner device shown in FIG. 3.
Figure 5:
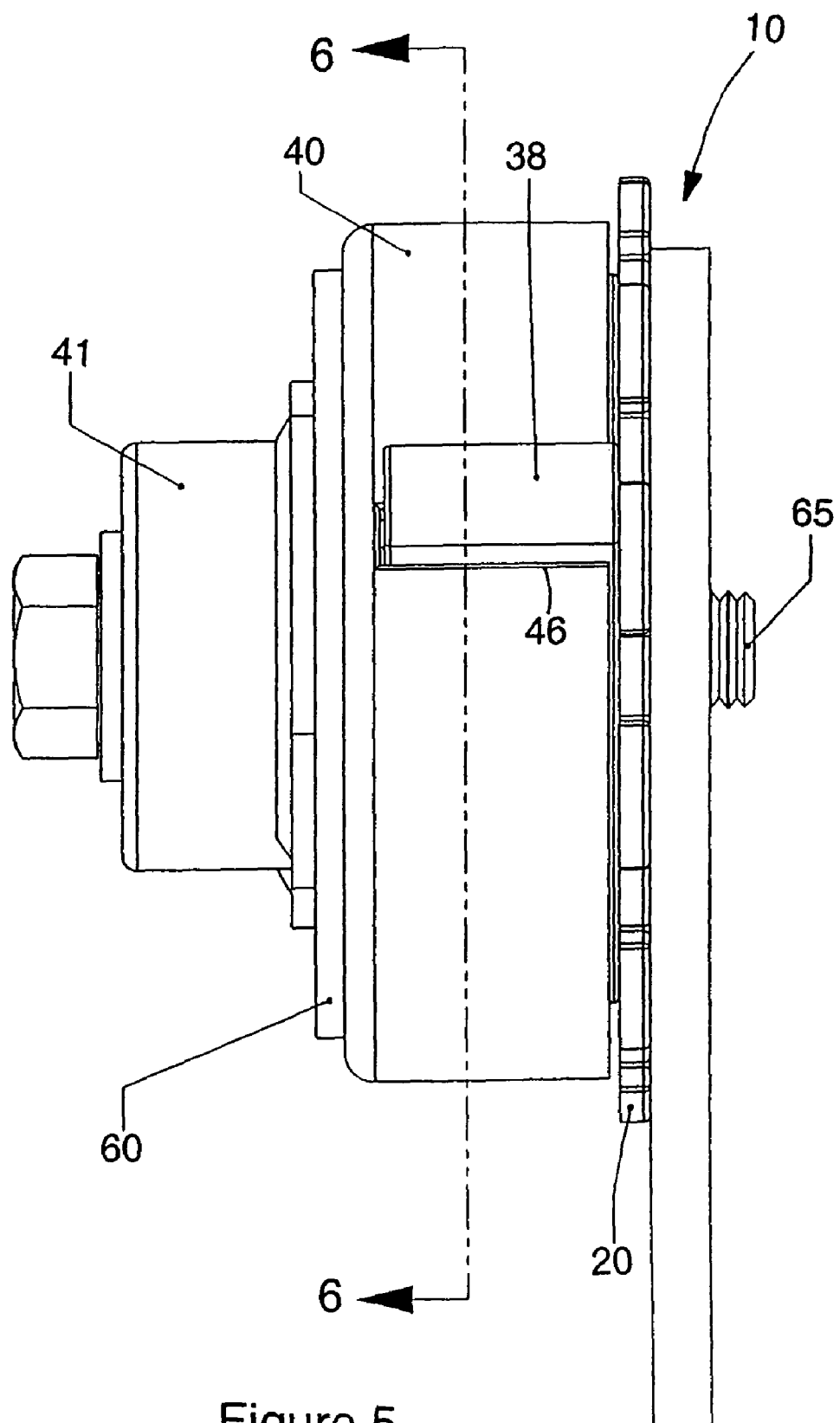
FIG. 5 is a bottom elevational view of the tensioner device shown in FIG. 3.

The housing 40 along with the bearings 50 are assembled onto the base 20 by inserting the shaft 30 through the inner race 51 of each bearing 50 while also aligning the slot 46 in the housing with the outer end 38 of the spring 35. The mounting bolt 65 and washer 66 are used to attach the housing 40 to the base. The bolt 65 extends through the bearings 50, the sleeve 30 and the base 20, and into the frame 7 of the device to which the tensioner is mounted. The head of the bolt 65 presses the washer 66 against the end of the shaft 30. In this way, the housing 40 is mounted over the base 20 and the spring 35 so that the housing is rotatable relative to the base. Referring to FIG. 4, the lower edge of the housing 40 is preferably spaced apart from the top surface of the base 20 so that a gap is formed between the housing and the base. The gap allows the housing to readily rotate relative to the base without frictional resistance and consequent wear. Rotating the house in a first direction increases the bias in the spring biasing the housing in a second direction that is reverse the first direction. The bias of the spring can be reversed by flipping over the spring in the housing.

The arm 60 is releasably connected to the housing 40. In this way, different arms of different length and configurations can be attached to the housing. The arm 60 is attached to the housing 40 by means of a bayonet-type connection. Specifically, the arm 60 includes a locking collar 62 that includes a locking tab 63 that cooperates with the locking flange 42 on the housing. The locking tab 63 on the arm is aligned with an opening or gap 44 in the locking flange 42 on the housing and is moved down through the gap and rotated either clockwise or counterclockwise, depending on which way the biasing force is to be applied by the tensioner 10. When the arm is rotated, it slides under a ledge below the flange that retains the locking tabs 63 of the locking collar on the arm. In this way, the locking collar 62 and the locking flange 42 cooperate to retain the arm to impede axial displacement of the arm relative to the housing. Preferably, the mounting configurations on the arm and housing are mirrored. This adds flexibility to connecting the arm and base, with less concern for how the gap 44 is oriented relative to the desired position of the arm 60.

An elongated portion of the arm 60 extends away from the locking collar, and includes a plurality of holes for mounting an idler pulley 70 to the arm. Specifically, the tensioner arm 60 includes one or more holes so that a bolt 72 can pass through the idler pulley 70 and the arm to attach the idler pulley to the arm with a nut 73.

The tensioner assembly 10 may be attached to the frame of a device or onto a mounting assembly attached to a device. Referring to FIG. 1, the tensioner assembly 10 is assembled so as to engage the belt in the position shown ("engaging position"). Before the belt 7 is assembled, the tensioner assembly 10 would typically be assembled with the arm 60 pivoted into a position rotated approximately 90 degrees from the engaging position (such as that shown in phantom lines). This position ("relaxed position") would not have any biasing load generated by the spring 35 because there would be no deflection in the spring.

When the belt is assembled, the tensioner arm 60 is rotated to the engaging position. During rotation of the arm 60, the housing 40 rotates in a radial direction around the pivot axis. By rotating the housing 40, the outer end 38 of the spring 35 moves in a radial direction because of its connection with the slot 46 in the housing 40. The inner end 37 of the spring remains fixed in contact with the slot 24 in the base 20 while the outer end 38 moves radially. As a result, movement of the outer end 38 of the spring 35 relative to the inner end 37 causes deflection in the spring. The deflection in the spring 35 generates a load which is resisted by a bias force exerted by the spring. In general, the bias force in the spring is proportional to the amount of deflection caused by rotation. The bias force is transferred through the lever arm 60 to the idler pulley 70 at the end of the arm. The idler pulley 70, in turn, pushes on the belt 7 and deflects the shape of the belt. The deflection of the belt form tension and removes the slack in the belt. The biasing force on the arm 60 also causes the bayonet-type attachment of the arm to the housing 40 to remain in engagement.

Figure 13:
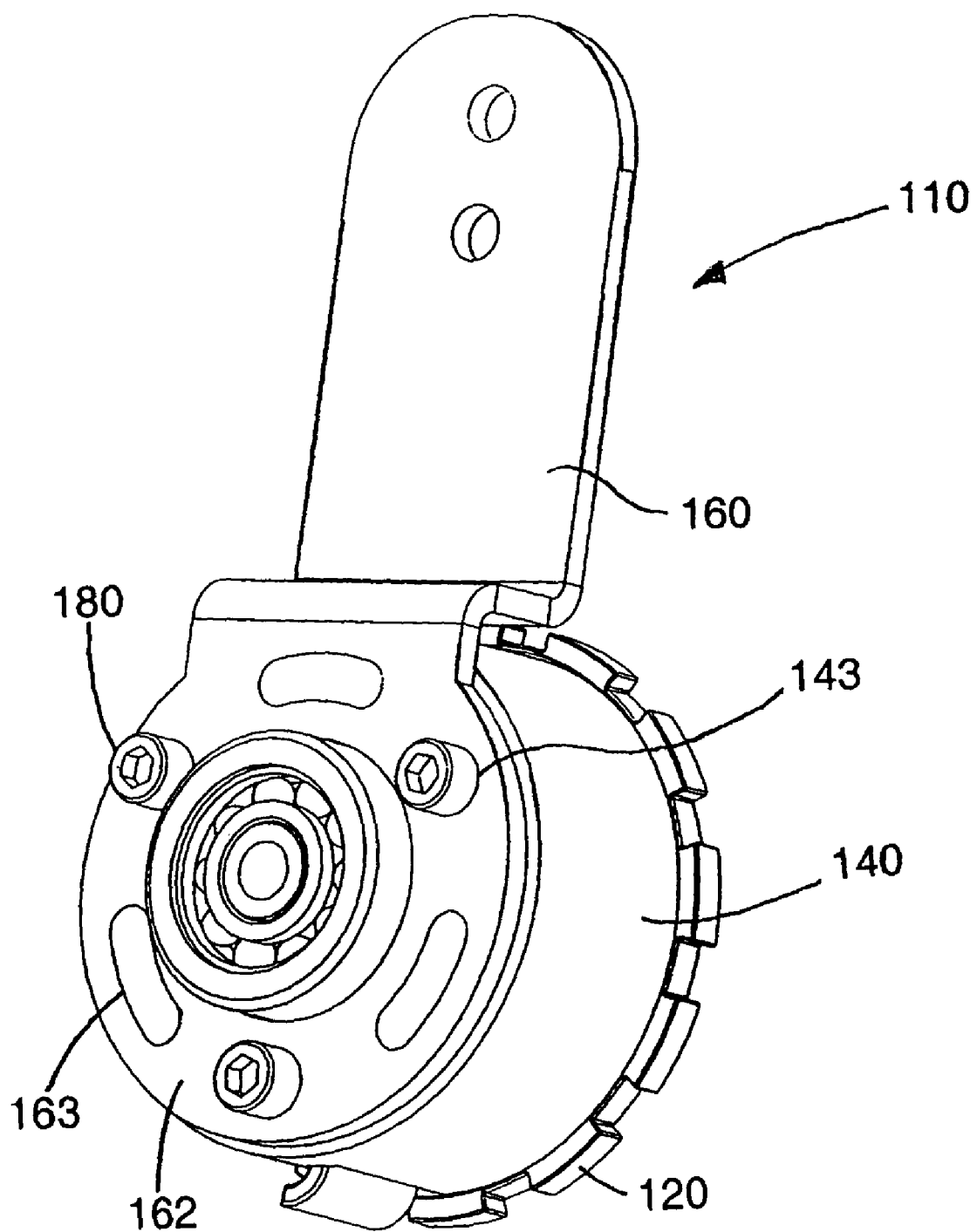
FIG. 13 is a perspective view of an alternative embodiment of a tensioner.
Figure 14:
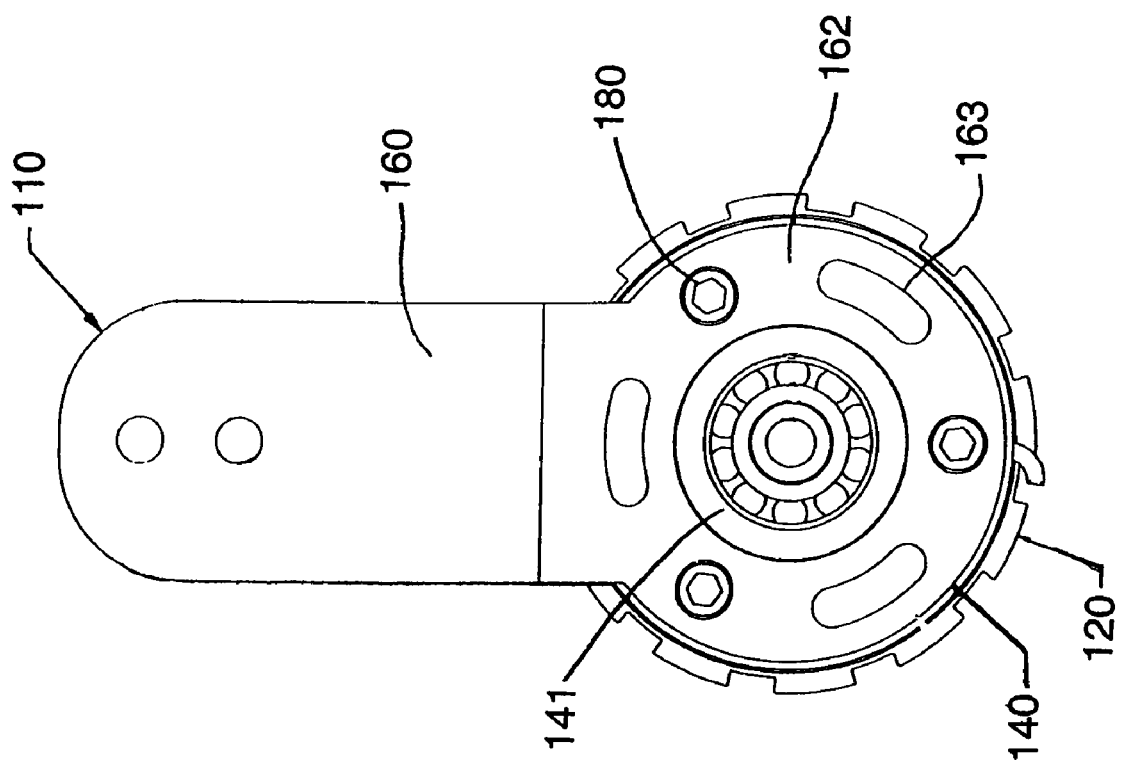
FIG. 14 is a plan view of the tensioner illustrated in FIG. 13.
Figure 15:
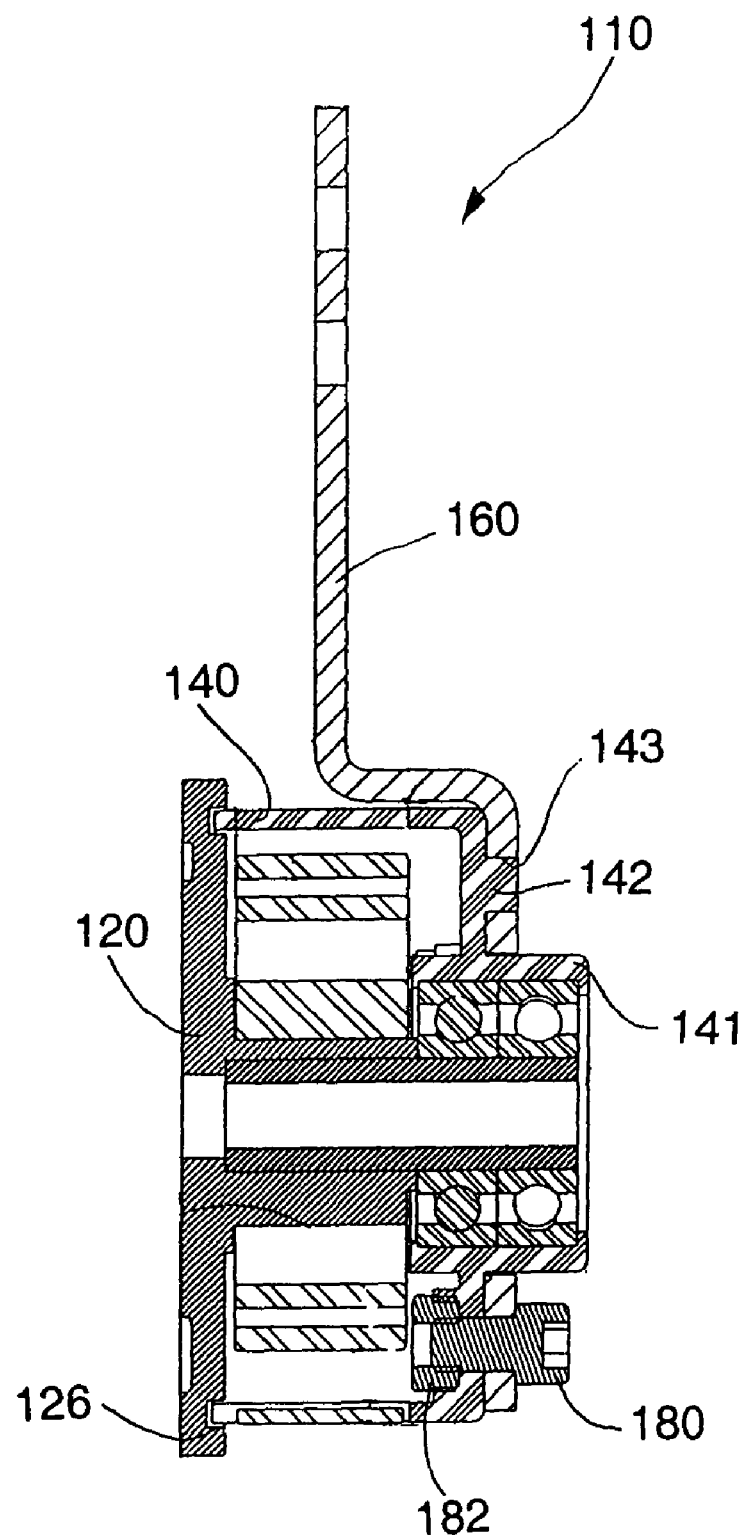
FIG. 15 is a sectional view of the tensioner illustrated in FIG. 13.

Referring now to FIGS. 13-15, an alternative embodiment of the tensioner is designated generally 110. The tensioner 110 is similar to the embodiment discussed above, and illustrates an alternative connection between the arm and the tensioner housing. Specifically, the tensioner 110 includes a plurality of fasteners, such as nuts 182 and bolts 180 that attach the arm 16 to the housing 140.

The tensioner 110 includes a base 120 that is similar to the base 20 in the first embodiment previously described. However, preferably, the base 110 includes a circular groove 126 that extends around the periphery of the top surface of the base, as shown in FIG. 15. The groove 126 is configured to receive the lower edge of the housing 140. Preferably, the groove 126 is wider than the thickness of the housing so that the housing can rotate in the groove as the housing is turned relative to the base. In this way, there is a gap between the lower edge of the housing and the bottom of the groove so that the housing can readily pivot relative to the base, but there is not an exposed gap that would allow dirt, dust and other contaminants to easily enter the housing.

The housing 140 is similar to the housing of the first embodiment, except that the housing includes a plurality of pins 142 and holes 143 for aligning and attaching the housing with the arm 160, rather than the locking flange 42 used in the first embodiment. Specifically, the upper surface of the housing 140 includes a plurality of pins 142 projecting upwardly, circumferentially spaced apart around a central hub 141. In addition, the upper surface of the housing includes a plurality of holes 143 circumferentially spaced apart around the central hub.

The arm 160 comprises a locking bracket 162 that includes a plurality of radial slots 163 circumferentially spaced apart. The slots are sized and configured to cooperate with the pins 142 on the top of the housing to align the arm 160 on the housing. In addition, the locking bracket includes a plurality of circumferentially spaced apart holes 164. The locking bracket also includes a central aperture configured to fit over the central hub 141 of the housing.

To attach the arm 160 to the housing 140, the mounting bracket 162 of the arm is placed onto the housing so that the pins 142 on the housing project into the radial slots 163 in the arm, and the holes 164 in the arm are aligned with the holes 143 on the top of the housing. The bolts 180 are then inserted through the aligned holes and threaded into the nuts 182 to attach the arm 160 to the housing 140. The nuts 182 may be inserted into recesses formed inside the housing so that the nuts are attached to the housing. Alternatively, rather than using separate nuts, the holes 143 in the housing can be threaded so that the bolts can be threaded directly into the housing to attach the arm to the housing. In this way, a variety of arms 160 of different lengths and configurations can be used with the same housing and base so that the tensioner can be used in a variety of applications.

Referring now to FIGS. 16-21 a third embodiment of a tensioner, which is the preferred embodiment, is designated generally 210. The tensioner 210 is similar to the embodiment 110 discussed above, and illustrates an alternative housing having a tensioning indicator 280 to indicate the direction for rotating the device to tension a belt.

The tensioner 210 includes a base 220 that is similar to the base 120 in the second embodiment previously described. Specifically, preferably, the base 210 includes a circular groove that extends around the periphery of the top surface of the base. The groove is configured to receive the lower edge of the housing 240. Preferably, the groove is wider than the thickness of the housing so that the housing can rotate in the groove as the housing is turned relative to the base. In this way, there is a gap between the lower edge of the housing and the bottom of the groove so that the housing can readily pivot relative to the base, but there is not an exposed gap that would allow dirt, dust and other contaminants to easily enter the housing.

The housing 240 is also similar to the housing 140 of the second embodiment, in that the housing includes a plurality of pins and holes for aligning and attaching the housing with the arm 260. Specifically, the upper surface of the housing 140 includes a plurality of pins projecting upwardly, circumferentially spaced apart around a central hub. In addition, the upper surface of the housing includes a plurality of holes circumferentially spaced apart around the central hub. Although the housing and base may be formed of a molded plastic as described previously, preferably the housing 240 and base 220 are formed of metal, such as cast aluminum.

The arm 260 comprises a locking bracket that includes a plurality of radial slots circumferentially spaced apart. The slots are sized and configured to cooperate with the pins on the top of the housing to align the arm 260 on the housing. In addition, the locking bracket includes a plurality of circumferentially spaced apart holes. The locking bracket also includes a central aperture configured to fit over the central hub of the housing.

To attach the arm 260 to the housing 240, the mounting bracket of the arm is placed onto the housing so that the pins on the housing project into the radial slots in the arm, and the holes in the arm are aligned with the holes on the top of the housing. The bolts are then inserted through the aligned holes and threaded into the nuts to attach the arm 260 to the housing 240. In this way, a variety of arms 260 of different lengths and configurations can be used with the same housing and base so that the tensioner can be used in a variety of applications.

As in the previous embodiments, the opposite end of the arm preferably includes an element for attaching a pulley or other element to the end of the arm. Specifically, the arm includes a pair of holes in the opposite end for bolting a pulley to the arm. Preferably, the pulley is attached so that the pulley is rotatable relative to the arm, and is configured to cooperate with the belt to be tensioned. In this way, the pulley provides a rotating interface with the belt as it tensions the belt.

As with the first and second embodiments, the third embodiment 210 includes a biasing element 235, such as a torsion spring. Preferably, the biasing element 235 has one end attached to a shaft and a second end attached to the housing 240, as described above in connection with the first embodiment. Furthermore, as in the first embodiment, preferably the third embodiment includes a bearing disposed between the shaft and the housing so that the housing is readily rotatable relative to the shaft.

Preferably, the biasing element is reversible so that it can provide a bias in a first direction when it is attached one way, and in a second direction when it is attached in a second way.

Figure 17:
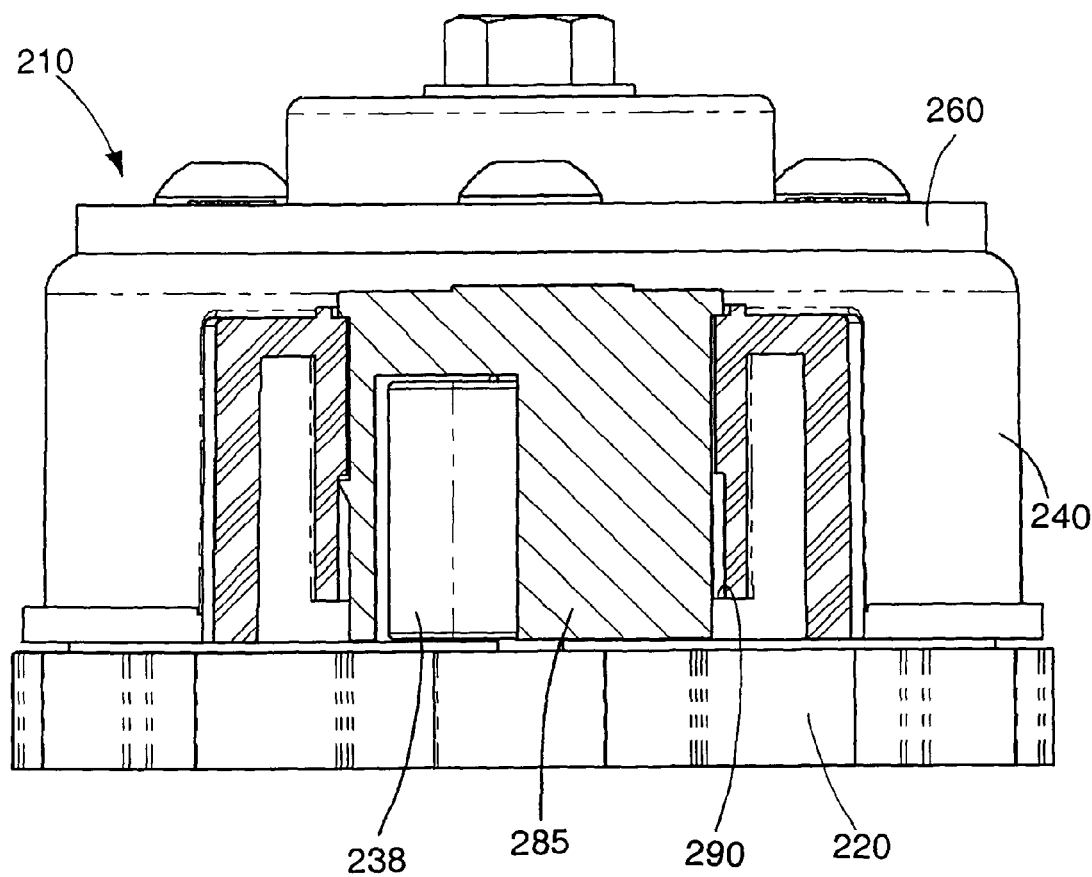
FIG. 17 is a cross-sectional view of te device of FIG. 16, taken along the line 17-17.

Specifically, when the spring 235 is attached to the housing and the shaft so that the convolutions run in the direction shown in FIG. 17, the device is operable to provide a counter-clockwise torsional bias (relative to the perspective of FIG. 17) when the housing is turned in a clockwise direction. By flipping the torsion spring over, so that the convolutions run in the opposite direction, the device is operable to provide a clockwise torsional bias when the housing is turned in a counter-clockwise direction.

Figure 16:
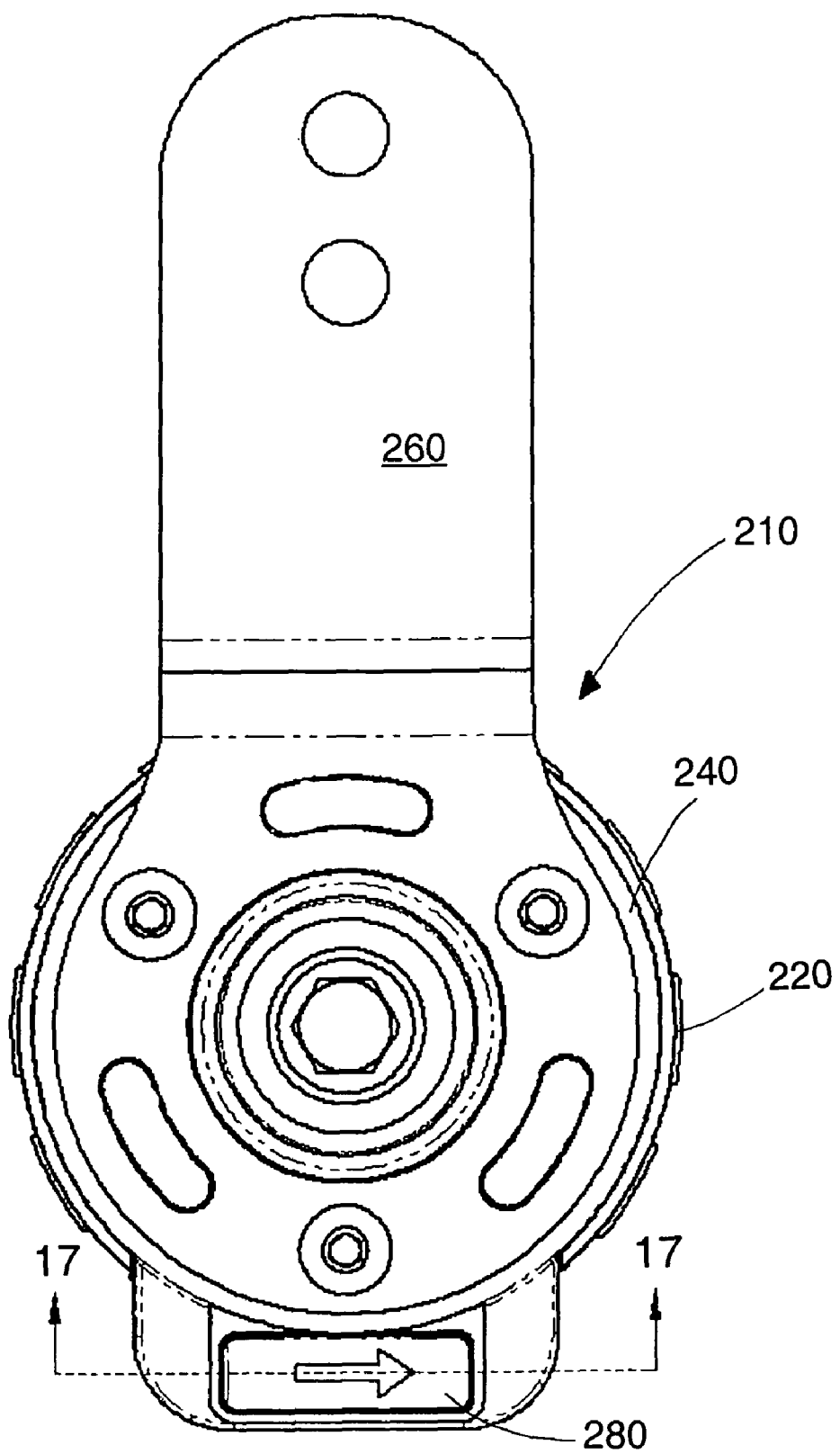
FIG. 16 is a plan view of a third embodiment of a belt tensioning assembly.

Since the biasing element 235 is reversible, preferably the device includes an indicator 280 for indicating which direction to turn the housing to provide a bias. Various elements can be used as an indicator. Preferably, the indicator includes an element with a graphical element, such as an arrow or other indicating the proper direction for turning the housing to provide a bias, as shown in FIG. 16.

Referring to FIGS. 16-19, preferably the indicator 280 includes a key or block 285 that is cooperable with a pocket 290 on the housing. The key 285 includes a top surface onto which a graphical indicator is molded or printed. Preferably, the key is configured so that it covers the pocket 290 so that the pocket is enclosed after the key is attached.

Figure 18:
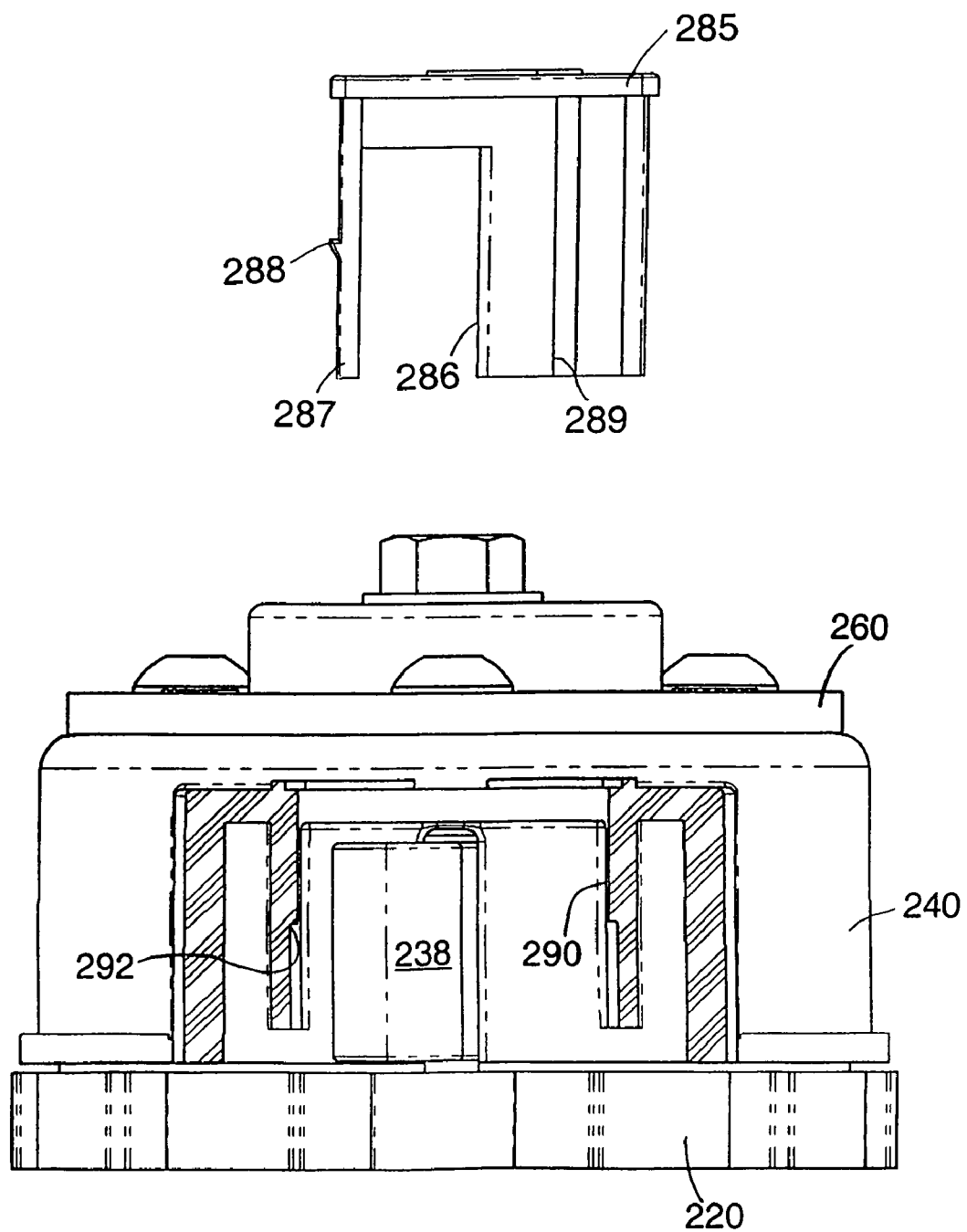
FIG. 18 is a partially exploded cross-sectional view of the device of FIG. 17.
Figure 19:
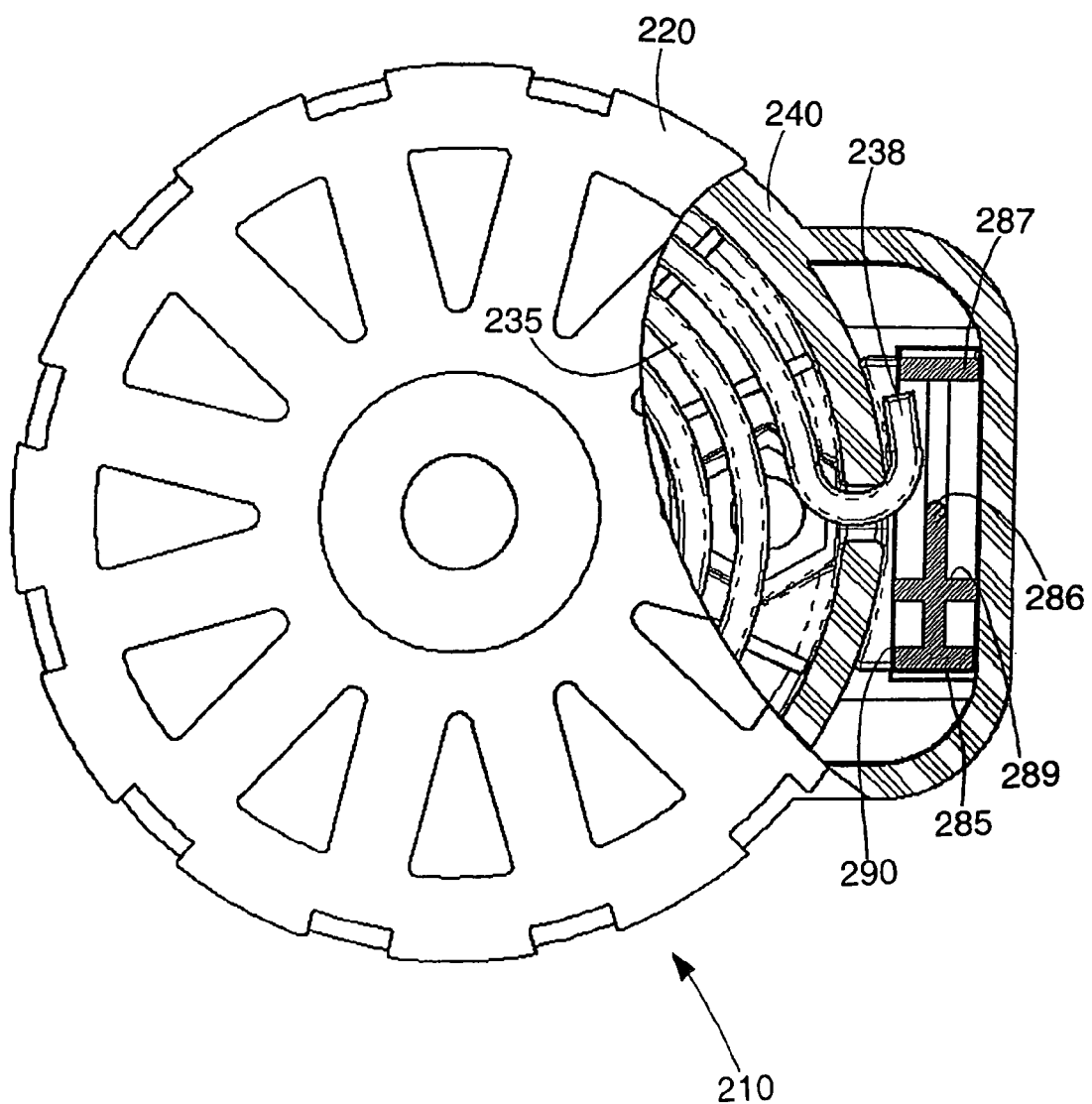
FIG. 19 is a partially broken away bottom view of the device of FIG. 16, illustrated without a tensioner arm.

The key 285 includes a recess 286 formed to cooperate with the tongue 238 on the outer end of the spring 235, as discussed further below. One end of the recess is formed by a leg 287 that projects away from the top surface of the key 285. The other side of the recess is formed by a wall 289 having a plurality of ribs, as shown in FIGS. 17-18.

The pocket 290 is configured to cooperate with the key 285. Although the pocket may be separately formed and attached to the housing, preferably, the pocket is integrally formed with the housing as show in FIGS. 16-17. The pocket is formed adjacent to the slot though which the spring 235 projects so that the tongue 238 of the spring projects into the pocket (see FIG. 19).

The key 285 is inserted into the pocket 290 so that the key indicates which direction the housing needs to be turned to tension the device. The key can be formed so that the key can be inserted into the pocket regardless of the orientation of the spring. Specifically, the recess 286 can be formed so that the tongue of the spring 238 does not interfere with the key regardless of the orientation of the spring. Alternatively, the pocket can be located in a position in which the spring does not project into the pocket.

However, if the key can be inserted into the pocket in either orientation regardless of the orientation of the spring, then it is possible to mistakenly insert the key in the wrong orientation, so that the indicator indicates the wrong direction for turning the housing. Therefore, it is desirable to have the key cooperate with a portion of the spring so that the orientation of the spring dictates the orientation of the key. Specifically, preferably the key and pocket are formed so that the tongue 238 of the spring interferes with the key when the key is inserted in the wrong orientation so that the key cannot be improperly inserted into the pocket.

Figure 20:
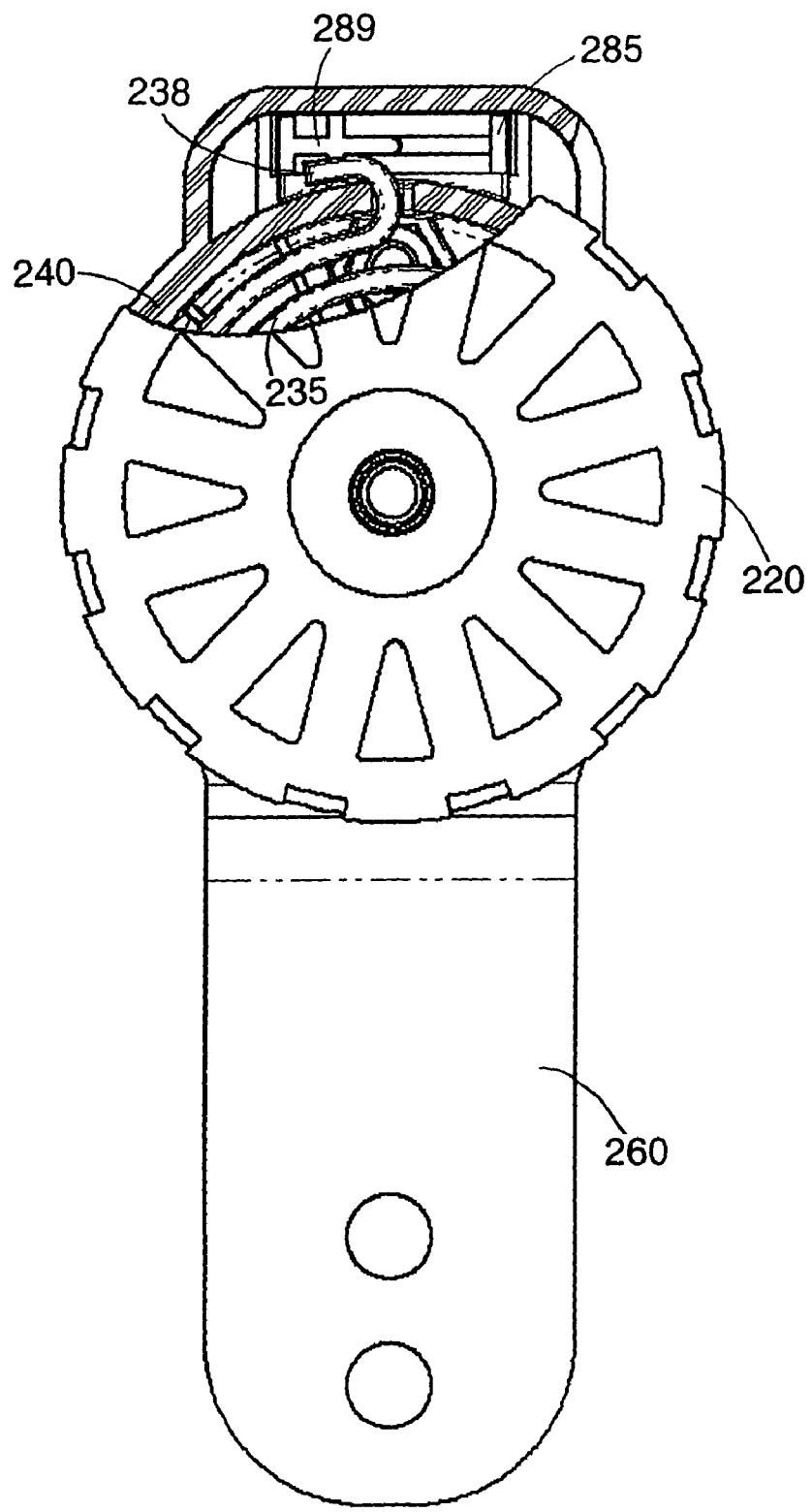
FIG. 20 is a partially broken away bottom view of the device of FIG. 16, illustrating the device with a indicator key inserted in the incorrect position.
Figure 21:
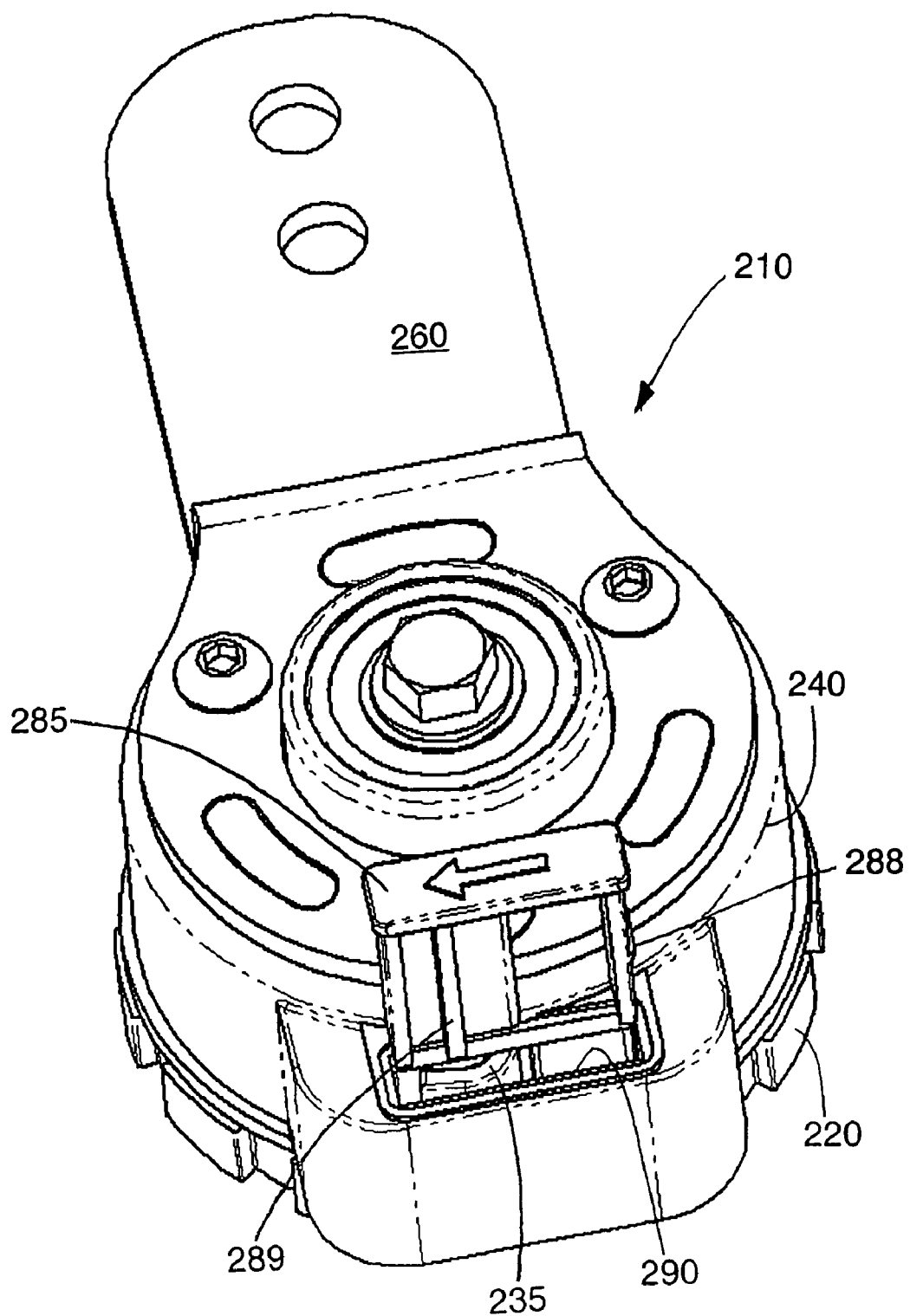
FIG. 21 is a partially exploded perspective view of the device of FIG. 20.

In this way, when the spring is oriented so that the housing should be turned counter-clockwise to provide torsion, the key is inserted into the pocket to show that the housing should be rotated in a counter-clockwise manner, as shown in FIG. 16. In this orientation, the recess 286 in the key 285 is aligned with the tongue 238 on the end of the spring. If one attempts to insert the key in the opposite orientation, the recess 286 does not align with the key. Instead, the wall 289 of the key engages the tongue of the spring so that the tongue impedes the key from being inserted into the pocket as shown in FIGS. 20-21. Similarly, if the spring is reversed, the tongue will project into the pocket so that the key will need to be reversed (from the perspective of FIG. 16).

Additionally, it may be desirable to lock the key in place so that it cannot fall out or be accidentally removed. Accordingly, preferably the pocket includes a shoulder that cooperates with a locking tooth or detent 288 on the leg 287 of the key 285. When the key is inserted into the pocket, the locking tooth 288 engages the shoulder 292 to prevent the key from being removed from the pocket.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. For instance, the indicator has been described above as a key 285 having a direction indicator printed or molded onto it. Alternatively, the directional indicator could be printed or molded onto the housing and the key could cover a portion of the directional indicator depending on the orientation of the key. For instance, two arrows could be printed on the housing, one pointing in a clockwise direction, one pointing in a counter-clockwise direction. The key can be configured so that in one orientation it covers the clockwise arrow, and in a second orientation it covers the counter-clockwise orientation. In yet another alternative, the key could be eliminated and the indicator could be applied directly onto the spring, so that on one side of the tongue an arrow is applied directly onto the spring pointing in a first direction, and on the other side of the spring an arrow is applied pointing in the opposite direction. A still further alternative indicator comprises a directional indicator molded or printed onto the housing beneath the area where the tongue projects. In this alternative, the tongue covers up a portion of the directional indicator depending on the orientation of the spring. For instance, two opposite arrows could be printed or molded into the pocket 290. When the spring is in a first orientation, the tongue covers the second arrow, but leaves the first arrow exposed, so that the user can see the first arrow, which would thereby indicate the proper direction to turn the housing to provide tension. Similarly, when the spring is in a second orientation the tongue covers the first arrow, but leaves the second arrow exposed so that the user can see the second arrow. Accordingly, the invention incorporates variations that fall within the scope of the following claims.

We claim:

1. A tensioner for tensioning a drive belt, comprising:
    a housing;
    an arm attached to the housing;
    a reversible biasing element formed of a plurality of convolutions so that in a first orientation the convolutions spiral in a clockwise direction and in a second orientation the convolutions spiral in a counterclockwise direction; and
    a reversible indicator attachable with the housing or the arm, wherein the indicator is attachable in a first position to identify a first direction when the biasing element is in the first orientation and in a second position to identify a second direction when the biasing element is in the second orientation;
    wherein the biasing element impedes attaching the indicator to the housing or arm in the first position when the biasing element is in the second orientation.

2. The tensioner of claim 1 wherein the indicator is detachably connectable with the arm or the housing.

3. The tensioner of claim 1 wherein the housing comprises a pocket and a portion of the biasing element projects into a first portion of the pocket when the biasing element is in the first orientation and the portion of the biasing element projects into a second portion of the pocket when the biasing element is in the second orientation, and wherein the indicator comprises an element cooperable with the portion of the biasing element projecting into the pocket to impede inserting the indicator into the pocket in the first position when the biasing element projects into the second portion of the pocket.

4. The tensioner of claim 1 wherein the arm is releasably connected with the housing.

5. The tensioner of claim 1 wherein the biasing element comprises a first end and a second end, wherein the first end of the biasing element engages the indicator to impede attaching the indicator to the housing or the arm in the first position when the biasing element is in the second orientation.

6. The tensioner of claim 5 wherein the first end of the biasing element is positioned to facilitate connection of the indicator to the housing or the arm in the second position when the biasing element is in the second orientation.

7. A tensioner for tensioning a drive belt, comprising:
a housing;
an arm attached to the housing;
a reversible biasing element formed of a plurality of convolutions so that in a first orientation the convolutions spiral in a first direction and in a second orientation the convolutions spiral in a second direction; and
a directional element connectable with the arm or the housing in a first orientation or a second orientation, wherein the directional element includes a graphical indicator relating to a desired direction for rotating the arm to tension a belt, wherein the biasing element impedes attaching the attachment to the housing or arm in the first orientation when the biasing element is in the second orientation.

8. The tensioner of claim 7 wherein the housing comprises a pocket and a portion of the biasing element projects into a first portion of the pocket when the biasing element is in the first orientation and the portion of the biasing element projects into a second portion of the pocket when the biasing element is in the second orientation, and wherein the directional element is cooperable with the portion of the biasing element projecting into the pocket to impede inserting the indicator into the pocket in the first position when the biasing element projects into the second portion of the pocket.

9. The tensioner of claim 7 wherein the arm is releasably connected with the housing.

10. The tensioner of claim 7 wherein the biasing element comprises a first end and a second end, wherein the first end of the biasing element engages the directional element to impede attaching the indicator to the housing or the arm in the first position when the biasing element is in the second orientation.

11. The tensioner of claim 10 wherein the first end of the biasing element is positioned to facilitate connection of the directional element to the housing or the arm in the second position when the biasing element is in the second orientation.

12. A method for tensioning a belt, comprising the steps of:
providing a base;
attaching a biasing element having a plurality of convolutions to the base in one of a first orientation in which the convolutions spiral in a first direction or a second direction in which the convolutions spiral in a second direction;
providing a housing;
attaching the housing to the base and the biasing element so that the housing encloses the biasing element and the biasing element is operable to provide a torsional force to bias the housing relative to the base;
connecting an indicator to the housing or the arm to identify a first direction for operating the tensioner to tension a belt when the belt is in the first orientation or a second direction for operating the tensioner to tension a belt when the biasing element is in a second orientation.

13. The method of claim 12 wherein the step of connecting an indicator comprises connecting the indicator when the biasing element is in a relaxed state.

14. The method of claim 12 wherein the indicator is connectable with the housing or arm in a first position indicative of the biasing element being in the first orientation and a second position indicative of the biasing element being in the second orientation, wherein the step of attaching a biasing element comprises attaching the biasing element to the base so that the biasing element impedes connecting the indicator to the housing or the arm in the first direction when the biasing element is in the second orientation.

* * * * *